United States Patent Office 2,938,500
Patented May 31, 1960

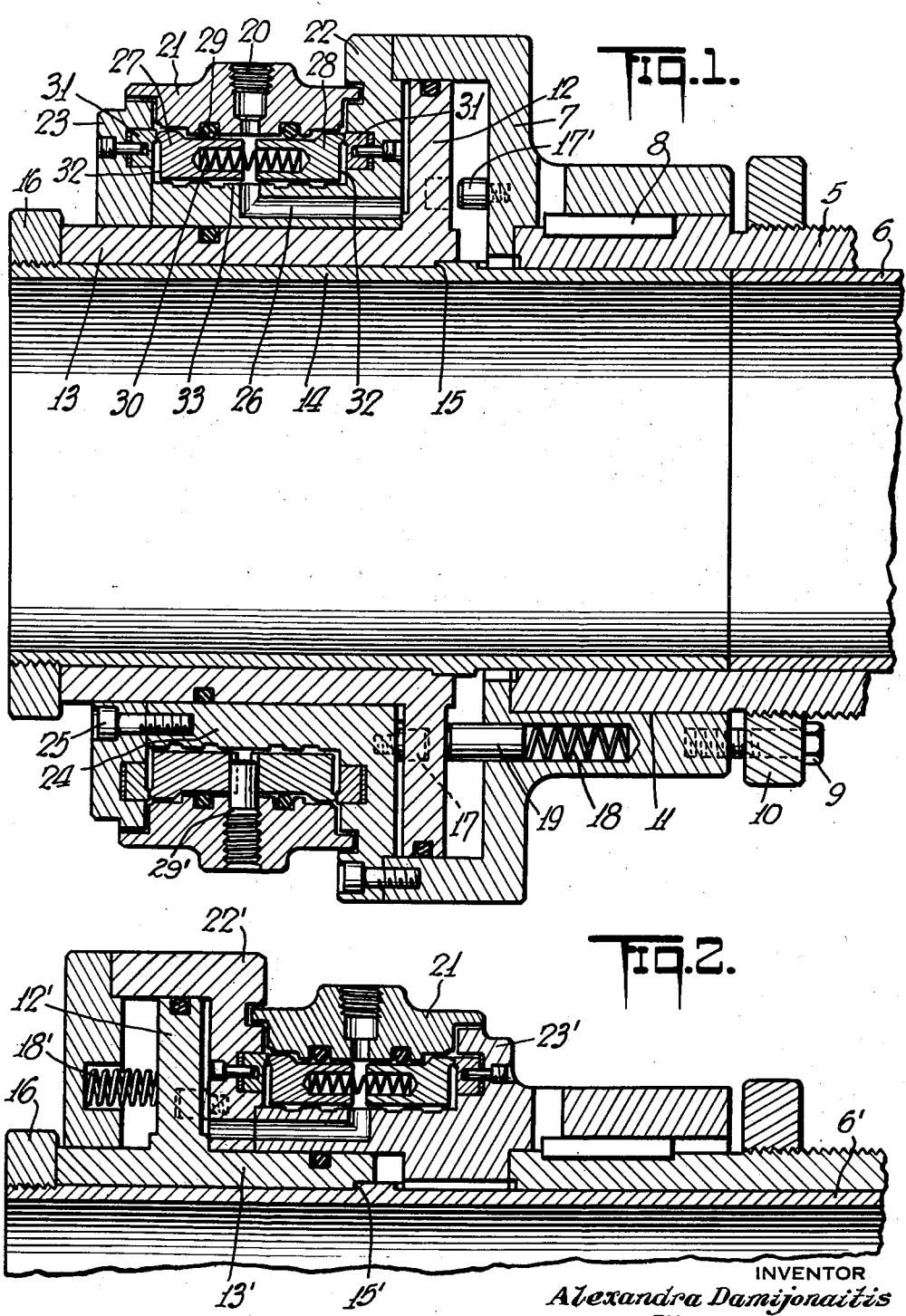

2,938,500

COLLET ACTUATOR

Alexandra Damijonaitis, New Britain, Conn., assignor to Union Manufacturing Company, New Britain, Conn., a corporation of Connecticut Filed Nov. 14, 1955, Ser. No. 546,522

8 Claims. (Cl. 121—38)

My invention relates to a collet or chuck actuator of the fluid pressure type.

It is an object of the invention to provide an improved fluid pressure actuated chuck or collet actuator.

Another object is to provide an improved fluid pressure actuated collet actuator involving a piston and cylinder means in which the piston is operated in one direction by pressure fluid and in the opposite direction by spring means.

It is another object to provide an improved piston and cylinder means for collet or chuck actuation which may be applied to and removed, as a unit, from a spindle.

Another object is to provide improved means for conducting pressure fluid to a relatively rotatable cylinder and piston without undue leakage or excessive friction.

Another object is to provide an improved seal means for conducting pressure fluid to a cylinder and piston means.

It is still another object to provide means for conducting pressure fluid from a stationary ring to a relatively rotatable piston and cylinder means, and to provide improved seal means to prevent excessive leakage of pressure fluid or undue friction.

Other objects and various features of novelty and improvement will be hereinafter pointed out or will become apparent to those skilled in the art.

In the drawings, which show, for illustrative purposes only, preferred forms of the invention:

Fig. 1 is a central, longitudinal, fragmentary sectional view through the rear end of a spindle and a collet or chuck actuator, illustrating my improved collet or chuck actuator mounted in operative position for a push type collet or chuck; and Fig. 2 is a fragmentary view similar to Fig. 1, but illustrating the invention as applied to a draw type rather than a push type collet.

As illustrated in Fig. 1 of the drawings, the rear end of a spindle 5 carries my improved collet actuator, and within the spindle is any desired or usual collet tube 6, which in the form shown is of the push type, that is, wherein the collet is closed when the tube 6 is moved to the right, as shown in Fig. 1. Since the collet or chuck carried by the spindle 5 and actuated by the collet tube or chuck actuator 6 may be of conventional or desired form, they are not illustrated in the drawings. In the form illustrated, a cylinder 7 is carried by the rear end of the spindle 5 and may be keyed thereto as indicated at 8 and secured in position by screws 9 or the like passing through a nut 10 adjustedly threaded on the spindle. The cylinder is counterbored to receive the extreme rear end of the spindle, as indicated at 11, so that, when the cylinder is in place and secured, the cylinder and spindle are perfectly rigid.

Within the cylinder 7 is a piston 12 having a rearward extension 13, which preferably fits the rear end of the push tube section 14. This push tube section 14 is preferably part of or a continuation of the standard collet tube 6. The tube 14 may have a shoulder 15 to fit in the counterbored end of the piston 12, as shown, and a nut 16 on the end of the tube 14 secures the piston extension 13 directly to the tube 14. The piston is guided in its reciprocation in the cylinder 7 as by means of projecting buttons 17 between the cylinder and piston, one of those members carrying the buttons and the other having recesses for receiving the buttons. The piston 12 is always urged, and, when free is moved to rearward or lefthand position by means of a series of springs 18, which may be housed in recesses in the cylinder extension, and may engage plugs 19 engaging the piston directly. When the piston is so moved to the left, it of course takes with it the tube 14, and the tube 6, if not secured to the tube 14, is also moved to the left by the usual spring of the collet so as to move the latter to open position.

The piston 12 is moved toward the right for moving the tubes 14 and 6 to the right for closing the collet, by means of pressure fluid, and one form of pressure fluid conducting means has been illustrated. In the form shown, the fluid is conducted through a standard passage 20 in a ring 21, which is loosely mounted between one cylinder head 22 and a retainer ring 23 secured to the cylinder extension 24 by means such as screws 25. The ring 21 is normally held against rotation while the cylinder and piston rotate with the spindle. The pressure fluid passes through the passage 20 and passage 26 in the cylinder extension 24 and into the cylinder at the lefthand side of the piston 12, so as to move the latter to the right as viewed in Fig. 1. In order to conduct the pressure fluid without undue leakage and without undue friction, I provide improved means in the form of a pair of seal rings 27—28 mounted within the fluid pressure ring 21 and sealed as by means of O-rings or the like 29. These seal rings 27—28 sealed in the ring 21 are held against rotation therein by a screw plug 29' in the ring and fitting in radial grooves in the seal rings 27—28 as clearly shown in Fig. 1. These seal rings 27—28 are urged apart as by means of compression springs 30 fitting in opposed bores in the seal rings 27—28, and there are contact lips on the seal rings 27—28 which contact with hard surfaces on the cylinder head 22 and the ring 23 and these hard surfaces may be on hardened steel rings 31 mounted on the head 22 and ring 23. It will be seen that the areas of the seal rings 27—28 at the outside, as indicated at 32, are about the same as the opposed inside areas of the sealing rings 27—28, so that pressure fluid passing between the rings 27—28 and the clearance spaces 33 acts upon surfaces 32 so that the pressure will be substantially balanced in a longitudinal direction on the seal rings 27—28. Thus substantially the only pressure between the seal rings 27—28 and the hardened surfaces on the head 22 and ring 23 will be the predetermined pressure created by the compression springs 30. The extent of the sealing pressure of the seal rings 27—28 may be accurately determined and just the right pressure obtained to reduce leakage to a minimum, while preventing undue friction between the seal rings 27—28 and the surfaces against which they bear, all regardless of the pressure of the pressure fluid, whether acting at high pressure or at exhaust pressure.

The seal rings 27—28 or the abutting rings 31 may be formed of a compressed, baked graphite and carbon material, which is very hard, light and wear-resistant. When the seal rings 27—28 are formed of this compressed graphite and carbon material, the coacting surfaces on the members 31 preferably will be formed of steel, since this graphite material and steel when rubbing on each other have a low coefficient of friction and wear will thus be reduced to a minimum and leakage reduced.

It will be noticed that the only wear surfaces between the rotating and the stationary parts will be the small contact surfaces between seal rings 27—28 and the rings 31. The valve means for controlling the pressure fluid through the passage 20 will normally be a separate three-way valve, and since it may be conventional it has not been illustrated.

In the form shown in Fig. 2, the parts are all substantially the same as heretofore noted and for the most part have been given corresponding reference characters and have not again been described.

In the form shown in Fig. 2, the longitudinal position of the cylinder and piston and the valve mechanism have been reversed, and some slight changes have been necessary to accommodate that change. In the form shown in Fig. 2, the piston 12' is urged toward the right, as by means of compression springs 18' instead of toward the left as in Fig. 1. The fluid pressure ring 21 is arranged between the cylinder head 22' and a ring part 23' corresponding to the cylinder head 22 and ring 23 of Fig. 1. The piston extension 13' is held between a shoulder or abutment 15' and the nut 16 on the draw tube 6', corresponding, respectively, to the shoulder 15' and nut 16 of Fig. 1. Thus the piston 12' is moved toward the right by spring pressure and toward the left by fluid pressure, and the collet draw tube 6' moves in both directions with the piston. Thus, in the form shown in Fig. 2, the collet or chuck actuator is arranged to act on a pull type collet rather than on the push type collet of Fig. 1.

It will be seen then that I have provided an improved chuck or collet actuator mechanism which may be handled as a unit and applied to a spindle and collet tube or other chuck actuating part, and that the parts are easily adapted for operation for either a push or pull type of collet or chuck. The pressure fluid may be conducted through a relatively fixed set of parts to the rotating piston and cylinder with a minimum of friction and wear. The parts are all simple and adjustment of the sealed surfaces is automatic by means of spring means, so that the sealing pressure will always remain substantially constant.

While the invention has been described in considerable detail and preferred forms illustrated, it is to be understood that changes and additions may be made within the scope of the invention as defined in the appended claims.

I claim:

1. A rotatable cylinder, a piston in said cylinder and rotatable therewith, a fixed pressure fluid ring, said ring and cylinder having communicating passage means to convey pressure fluid from said ring to one side of said piston, sealing means between said ring and cylinder, said sealing means including a pair of seal rings carried by said pressure fluid ring, said cylinder being rotatable relatively to said rings and having opposed sealing surfaces in circumferentially continuous sealing engagement with each of said rings, means for urging said seal rings into sealing engagement with said sealing surfaces aforesaid, said seal rings having passage means to transmit pressure fluid from said pressure fluid ring to said cylinder.

2. In the combination defined in claim 1, said means for urging said seal rings into sealing engagement with said sealing surfaces aforesaid, comprising spring means to urge said seal rings into sealing engagement with said sealing surfaces on said cylinder.

3. A cylinder and piston, means for conducting pressure fluid to said piston including a pressure fluid ring, a cylinder part coaxial with said pressure fluid ring, said ring and cylinder being relatively rotatable, a pair of seal rings interposed between said fluid pressure ring and said cylinder, said cylinder being rotatable relatively to said seal rings and including axially spaced seal surfaces having circumferentially continuous seal contact with said seal rings, means for urging said seal rings axially into sealing engagement with said seal surfaces on said cylinder, said fluid pressure ring and seal rings and cylinder having registering passage means for conducting pressure fluid to one side of said piston, for moving the same in one direction.

4. In the combination defined in claim 3, and spring means for urging said piston in the opposite direction.

5. In the combination defined in claim 3 and circumferentially extending seals between said seal rings and said pressure fluid ring.

6. In the combination defined in claim 3, and pin means engaging said seal rings and said fluid pressure ring to prevent relative rotation therebetween.

7. A cylinder, said cylinder having a part telescopically received on a spindle end, a nut on said spindle, said cylinder part being secured to said nut, an actuator in said spindle and projecting rearwardly therefrom, a piston in said cylinder and having an extension bored to receive said actuator, a nut on said actuator and abutting the rear end of said piston extension, said cylinder having a cylindrical part surrounding said piston extension, a pressure fluid ring about said cylindrical part of said cylinder, seal means between said cylindrical part and said fluid pressure ring, fluid passage means through said fluid pressure ring and said seal means and said cylinder to one side of said piston to admit pressure fluid to move the same in one direction, spring means between said piston and cylinder for urging said piston in the opposite direction, and guide means between said piston and cylinder to prevent rotation of said piston in said cylinder.

8. A cylinder and piston, means for conducting pressure fluid to said piston including a pressure fluid ring, a cylinder part coaxial with said pressure fluid ring, said ring and cylinder being relatively rotatable, a pair of seal rings interposed between said fluid pressure ring and said cylinder, said cylinder being rotatable relatively to said seal rings and including seal surfaces adapted for sealing engagement with said seal rings, means for urging said seal rings axially into sealing engagement with said seal surfaces on said cylinder, said fluid pressure ring and seal rings and cylinder having registering passage means for conducting pressure fluid to one side of said piston for moving the same in one direction, said seal rings having opposed surfaces exposed to pressure fluid to balance the same axially.

References Cited in the file of this patent
UNITED STATES PATENTS

| | | |
|---|---|---|
| 1,454,121 | Lavoie | May 8, 1923 |
| 1,934,411 | Dahlman | Nov. 7, 1933 |
| 1,968,700 | Milotta | July 31, 1934 |
| 2,291,147 | Carlsen | July 28, 1942 |
| 2,573,403 | Church | Oct. 30, 1951 |
| 2,597,280 | Barnes | May 20, 1952 |